April 2, 1946.  H. W. DIETERT  2,397,846
APPARATUS FOR ANALYSIS OF GAS
Filed Oct. 4, 1943
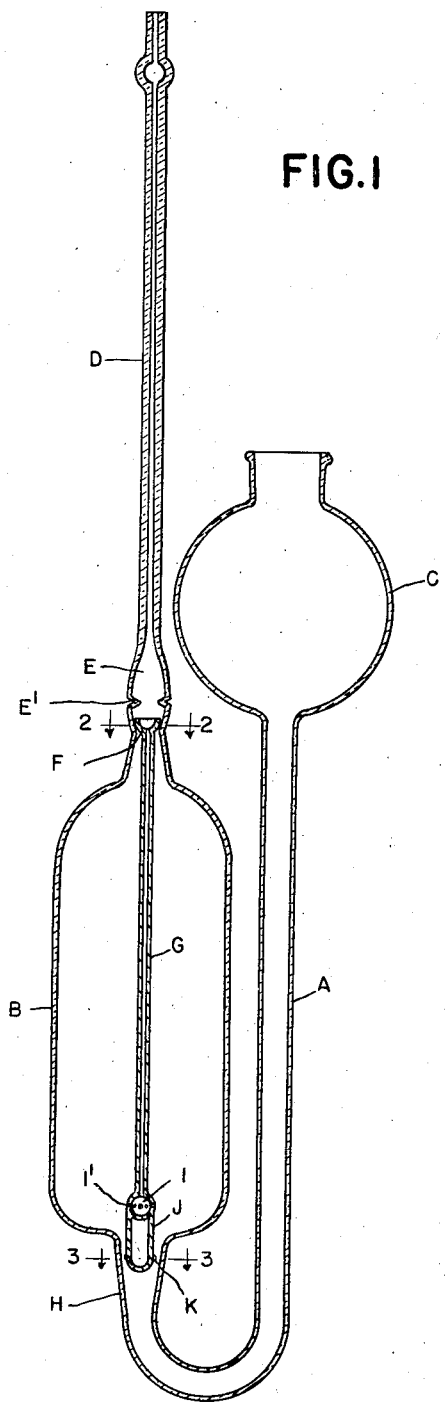
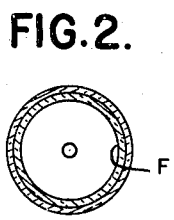
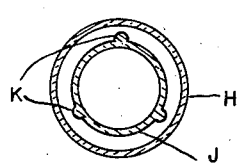
INVENTOR.
HARRY W. DIETERT
BY
ATTORNEYS Patented Apr. 2, 1946

2,397,846

UNITED STATES PATENT OFFICE 2,397,846

APPARATUS FOR ANALYSIS OF GAS

Harry W. Dietert, Detroit, Mich.

Application October 4, 1943, Serial No. 504,948

5 Claims. (Cl. 23—292)

The invention relates to apparatus for the analysis of gas and of that type in which certain constituents of a gaseous mixture are removed by absorption. More particularly, the invention relates to the absorption means and consists in the novel construction as hereinafter set forth.

In the drawing:

Fig. 1 is a vertical central section through the apparatus;

Fig. 2 is a cross section on line 2—2, Fig. 1; and

Fig. 3 is a cross section on line 3—3, Fig. 1.

As illustrated, A is a U-tube, one leg of which is expanded to form a substantially cylindrical container B for the absorption material. The other leg is expanded to form a receptacle C at a higher level than the container B and constituting a displacement chamber. D is a gas conduit integral with the container B and extending upward from the upper end thereof. Adjacent to the container the conduit D is expanded to form a chamber E and the wall of this chamber is downwardly tapered to form a seat for a check valve F. The valve F is of a hollow semi-spherical form and has depending therefrom the tubular stem G which extends completely through the container B and at its lower end is guided in a portion H of the U-tube. Near the bottom of the container the stem G is expanded to form a chamber I which has an equatorial series of perforations I' therein. There is also a hollow portion J beneath the portion I which forms a float for partly counterbalancing the weight of the valve and its stem. A plurality of points K project radially from the hollow float portion J for guiding contact with the portion H of the U-tube.

With the construction described it will be understood that the absorption material such as a solution of potassium hydroxide (KOH) completely fills the container B below the valve F. The upper end of the gas conduit D is adapted to be connected to a burette (not shown) from which a measured quantity of gas is displaced and forced downward through said conduit D and the tubular stem G. The displacement pressure may be developed by manipulation of the usual leveling bottle (not shown) and is sufficient to overcome the hydrostatic pressure of the liquid in the container B. Thus, the gas will be forced downward into the chamber I and through the perforations I' to bubble upward through the absorption liquid. This will absorb one constituent of the gas such as carbon dioxide ($CO_2$) while the residual gas will collect in the upper portion of the container B displacing the liquid therefrom and forcing it into the receptacle C. After the full measured volume of gas has been passed through the absorption liquid, the pressure is reversed (by lowering of the leveling bottle) which will return the liquid from the receptacle C into the container B opening the valve F and displacing the gas into the conduit D from which it is returned to the burette.

The apparatus as described can be easily fashioned from glass or other suitable material. The portion of the conduit D forming the chamber E is preferably contracted above the valve F as indicated at E' to limit the upper displacement of said valve.

What I claim as my invention is:

1. A gas absorption apparatus comprising a U-tube having in one leg thereof an enlargement forming a container for an absorption liquid and in the other leg a displacement receptacle for said liquid, a gas conduit extending upward from the upper end of said container and being enlarged adjacent thereto with a restriction at the lower end of said enlargement forming a valve seat, a downwardly closing check valve on said valve seat, and a tubular stem integral with and depending from said check valve to extend completely through said container into a portion of the U-tube beneath the same, said stem having an enlargement provided with a circumferential series of ports through which gas may be discharged into the lower portion of said container to bubble up through the liquid therein, the portion of said stem beneath said enlargement being expanded and closed to form an air chamber constituting a float which partially balances the weight of the valve and stem.

2. A gas absorption apparatus comprising a U-tube having in one leg thereof an enlargement forming a container for an absorption liquid and in the other leg a displacement receptacle for said liquid, a gas conduit extending upward from the upper end of said container and being enlarged adjacent thereto with a restriction at the lower end of said enlargement forming a valve seat, a downwardly closing check valve on said valve seat, and a tubular stem integral with and depending from said check valve to extend completely through said container into a portion of the U-tube beneath the same, said stem having an enlargement provided with a circumferential series of ports through which gas may be discharged into the lower portion of said container to bubble up through the liquid therein, the portion of said stem beneath said enlargement being expanded and closed to form an air chamber constituting a float which partially balances the weight of the valve and stem, said expanded portion having a plurality of radially projecting points for guiding contact with the portion of the U-tube in which they are located.

3. A gas absorption apparatus comprising a U-tube having in one leg thereof an enlargement forming a container for an absorption liquid and in the other leg at a higher level than the container an enlargement forming a displacement receptacle for said liquid, a gas conduit integral with and extending upward from the top of said container, said conduit being provided adjacent the top of said container with an enlarged portion, the bottom of said enlarged portion being restricted and forming a valve seat, a downwardly closing check valve on said valve seat, said valve being of a hollow semi-spherical form and having a depending tubular stem extending through said container into a portion of the U-tube beneath said container, said stem being provided adjacent the bottom of said container with an enlargement having one or more ports through which gas from the enlarged portion of said gas conduit may be discharged into the container near the bottom thereof to bubble up through the liquid therein, said stem being provided beneath the enlargement thereof with a closed hollow enlargement forming an air chamber constituting a float for at least partially balancing the weight of said valve and stem, said float having means for guiding contact with the portion aforesaid of said U-tube.

4. A gas absorption apparatus comprising a U-tube having in one leg thereof an enlargement forming a container for an absorption liquid and in the other leg an enlargement forming a displacement receptacle for said liquid, a gas conduit extending upward from the top of said container, said conduit being provided adjacent the top of said container with an enlarged portion, the bottom of said enlarged portion being restricted and forming a valve seat, a downwardly closing check valve on said valve seat, said valve having a depending tubular stem provided within and adjacent the bottom of said container with one or more ports through which gas from the enlarged portion of said gas conduit may be discharged into the container to bubble up through the liquid therein, said stem being provided beneath said ports with a closed hollow portion forming an air chamber constituting a float for at least partially balancing the weight of said valve and stem, said float having means for guiding contact with a portion of said U-tube beneath said container.

5. A gas absorption apparatus comprising a U-tube having in one leg thereof an enlargement forming a container for an absorption liquid and in the other leg an enlargement forming a displacement receptacle for said liquid, a gas conduit extending upward from the top of said container, said conduit being provided adjacent the top of said container with an enlarged portion, the bottom of said enlarged portion being restricted and forming a valve seat, a downwardly closing check valve on said valve seat, said valve having a depending tubular stem provided within and adjacent the bottom of said container with an enlargement having one or more ports through which gas from the enlarged portion of said gas conduit may be discharged into the container to bubble up through the liquid therein, said stem being provided beneath said enlargement with a closed hollow portion forming an air chamber constituting a float for at least partially balancing the weight of said valve and stem, said float having means for guiding contact with a portion of said U-tube beneath said container.

HARRY W. DIETERT.